US012289633B2

(12) United States Patent
Stagg (10) Patent No.: US 12,289,633 B2
(45) Date of Patent: Apr. 29, 2025

(54) RADIO FREQUENCY (RF) DIAGNOSTIC COVERAGE FOR WIRELESS PROXIMITY STOP SYSTEMS AND CORRESPONDING METHODS OF OPERATING WIRELESS PROXIMITY STOP SYSTEMS

(71) Applicant: Cattron North America, Inc., Warren, OH (US)

(72) Inventor: David Stagg, Flat Rock, NC (US)

(73) Assignee: Cattron North America, Inc., Warren, OH (US)

( * ) Notice: Subject to any disclaimer, the term of this patent is extended or adjusted under 35 U.S.C. 154(b) by 402 days.

(21) Appl. No.: 17/880,428

(22) Filed: Aug. 3, 2022

(65) Prior Publication Data

US 2023/0403597 A1 Dec. 14, 2023

Related U.S. Application Data (60) Provisional application No. 63/394,207, filed on Aug. 1, 2022, provisional application No. 63/351,307, filed on Jun. 10, 2022.

(51) Int. Cl.
*H04R 29/00* (2006.01)
*H04B 17/327* (2015.01)
(Continued)

(52) U.S. Cl.
CPC ...... *H04W 28/0236* (2013.01); *H04B 17/327* (2015.01); *H04L 5/0073* (2013.01);
(Continued)

(58) Field of Classification Search
CPC ...... G05B 19/0425; G05B 9/02; G05B 19/02; H04W 4/80; H04W 4/90; H04L 67/12;
(Continued)

(56) References Cited

U.S. PATENT DOCUMENTS 8,125,313 B2 2/2012 Griessnig
11,073,811 B2 7/2021 Stagg
(Continued)

FOREIGN PATENT DOCUMENTS

EP 3170313 B1 5/2017
EP 3422121 A1 1/2019
WO WO-2015087068 A1 * 6/2015 ............... F16P 3/14

OTHER PUBLICATIONS

10R-ASO-MCU; 9M02-8998-A002-EN; User-Manual; Cattron.com; Feb. 2021; 3 pages.
(Continued)

*Primary Examiner* — Sai Aung
(74) *Attorney, Agent, or Firm* — Harness, Dickey & Pierce, P.L.C.; Anthony G. Fussner (57) ABSTRACT

A wireless Proximity Stop system includes one or more Machine Safety Devices (MSDs) and one or more Personal Safety Devices (PSDs). Each MSD includes a wireless communication interface with Diagnostic Coverage (DC). Each PSD includes a wireless communication interface with Diagnostic Coverage (DC) for wireless communication with the one or more MSDs. Each PSD is configured to be operable for initiating and safely terminating a Proximity Stop signal to the one or more MSDs to trigger a Proximity Stop function of the one or more MSDs for stopping operation of a connected machine(s). Each PSD includes a transmitter and separate receiver operable for verifying that the transmitter is transmitting with the correct data and power level. Each MSD includes a receiver and a separate transmitter or local transmitting beacon usable by the receiver for verifying that the receiver is capable of receiving with the correct data and power level.

20 Claims, 4 Drawing Sheets

(51) Int. Cl.
| | |
|---|---|
| *H04L 5/00* | (2006.01) |
| *H04R 3/00* | (2006.01) |
| *H04W 4/02* | (2018.01) |
| *H04W 4/80* | (2018.01) |
| *H04W 28/02* | (2009.01) |
| *H04W 52/02* | (2009.01) |
| *H04W 52/34* | (2009.01) |
| *H04W 72/044* | (2023.01) |
| *H04W 72/0446* | (2023.01) |

(52) U.S. Cl.
CPC ....... *H04W 52/34* (2013.01); *H04W 72/0446* (2013.01); *H04W 72/0473* (2013.01)

(58) Field of Classification Search
CPC ............ H04R 2499/11; H04R 2420/00; H04R 2420/01; H04R 2499/13; H04R 3/00; H04R 5/04
See application file for complete search history.

(56) References Cited

U.S. PATENT DOCUMENTS

| | | | |
|---|---|---|---|
| 2006/0097860 A1 | 5/2006 | Halfmann et al. | |
| 2006/0244619 A1* | 11/2006 | Nickels | H01H 47/002 340/644 |
| 2015/0032293 A1 | 1/2015 | O'Neill et al. | |
| 2016/0087734 A1* | 3/2016 | Kordik | H04B 17/0085 455/67.14 |
| 2019/0004489 A1* | 1/2019 | Stagg | G05B 19/048 |
| 2019/0126489 A1 | 5/2019 | Wada et al. | |
| 2019/0149510 A1 | 5/2019 | Barthel et al. | |
| 2020/0033816 A1 | 1/2020 | Uemura et al. | |
| 2020/0139950 A1 | 5/2020 | James et al. | |
| 2020/0160682 A1* | 5/2020 | Johnson | F16P 3/147 |
| 2021/0003981 A1 | 1/2021 | Stagg | |
| 2021/0232114 A1* | 7/2021 | Stagg | H04W 76/10 |
| 2021/0302967 A1 | 9/2021 | Ko et al. | |
| 2021/0341906 A1* | 11/2021 | Helpenstein | G05B 19/4184 |

OTHER PUBLICATIONS

Cattron Safe-E-Stop™—Wireless-Emergency-Stop; Cattron.com; Feb. 2021; 2 pages.

Safe-E-Stop™ SIL 3 Rated Wireless Emergency Stop; Cattron.com; Copyright 2022; 2 pages.

European Search Report for EP22196793 that claims priority to the instant application; dated May 19, 2023; 7 pages.

* cited by examiner

RADIO FREQUENCY (RF) DIAGNOSTIC COVERAGE FOR WIRELESS PROXIMITY STOP SYSTEMS AND CORRESPONDING METHODS OF OPERATING WIRELESS PROXIMITY STOP SYSTEMS

CROSS-REFERENCE TO RELATED APPLICATIONS

This application claims priority to and the benefit of U.S. Provisional Patent Application No. 63/351,307 filed Jun. 10, 2022 and of U.S. Provisional Patent Application No. 63/394,207 filed Aug. 1, 2022. The entire disclosure of these two U.S. Provisional Patent Applications are incorporated herein by reference.

FIELD

The present disclosure generally relates to wireless Proximity Stop systems and corresponding methods of operating wireless Proximity Stop systems.

BACKGROUND

This section provides background information related to the present disclosure which is not necessarily prior art.

Hardwired Emergency stop stations are used to allow operators to bring a machine or process to a safe state. But these hardwired stations can require time for an operator to move to the location of the hardwired stop switch to trigger the Emergency stop process. Additionally, there are machines typically of a mobile nature that are dangerous or impossible to safely approach.

DRAWINGS

The drawings described herein are for illustrative purposes only of selected embodiments and not all possible implementations and are not intended to limit the scope of the present disclosure.

Corresponding reference numerals indicate corresponding (though not necessarily identical) parts throughout the several views of the drawings.

DETAILED DESCRIPTION

Example embodiments will now be described more fully with reference to the accompanying drawings.

As noted above, hardwired Emergency stop stations are used to allow operators to bring a machine or process to a safe state. But these hardwired stations can require time for an operator to move to the location of the hardwired stop switch to trigger the Emergency stop process. Additionally, there are machines typically of a mobile nature that are dangerous or impossible to safely approach. To avoid or eliminate these problems, a wireless Proximity Stop system can be used to enhance safety by allowing an individual or a group of operators to automatically trigger a Proximity Stop without having to move to a hardwired Emergency stop station. A wireless Proximity Stop system can include a wireless Proximity Stop device that provides Proximity Stop capability directly to the user and enables the user to instantly activate the machine stop function even when a hardwired station is out of reach or in a hazard zone. By way of example, wireless Proximity Stop systems are usable to enhance safety by allowing an individual or a group of operators to be protected by a Proximity zone and stop any in zone machines without any delay and without any personal action other than initiating the PSDs Proximity mode.

Although existing wireless Emergency stop systems provide machine and equipment safety enhancements, the inventor hereof has recognized that further improvements in wireless Emergency stop systems would be beneficial for enhanced machine and equipment safety as disclosed herein.

In a standard wireless Emergency Stop (E-Stop) system, the PSD is carried by the user and it is in continuous RF communication with the machine safety device (MSD) of a machine. When the PSD is linked to the MSD, the PSD can issue an E-Stop to the MSD. Any loss of communication between the PSD and MSD will also generate an E-Stop. This ensures that the machine will be rendered to a safe state even with loss of communication between the PSD and MSD. This standard E-Stop system works well for relatively small local installations where the PSD and MSD can stay within range of each other during use. But as recognized herein, the standard E-Stop system will not be sufficient for larger installations. When the machine is mobile, the MSDs will move around e.g., within a large warehouse or large open site, such that continuous and reliable communications between the PSD and MSDs are not possible. In this case, the non-continuation communications between the PSD and MSDs would lead to machines unacceptably stopping operation when out of range of the PSD.

As further recognized herein, only the MSDs in the proximity of the PSD(s) need to be stopped to protect the user(s) of the PSD(s) as other MSDs that are not in proximity to the PSD(s) present no danger to the user(s) of the PSD(s). Also, any MSDs not currently near a PSD could move toward the PSD, and the MSDs would then need to automatically stop operation when the MSDs move into that PSD's zone.

To resolve the above issues, the inventor hereof has recognized that the PSDs and MSDs need to be removed from a continuous communication mode. But eliminating the need to be in continuous communication eliminates the certainty that a PSD and MSD are 'actually able' to communicate with each other when required, which, in turn, eliminates verifiable safety. After recognizing the above, exemplary embodiments were developed and/or are disclosed herein of wireless Proximity Stop systems configured or provided with diagnostic coverage to the RF transmission and reception to verify that RF communications are possible in a non-maintained RF link.

In exemplary embodiments, one or more PSDs and one or more MSDs are configured to integrate diagnostic coverage into their radio frequency (RF) systems. In such exemplary embodiments, each PSD includes a transmitter and separate receiver, both in a Category 3 architecture, which verifies the transmitter is transmitting with the correct data and power level. Each MSD includes a receiver and a separate transmitter or local transmitting beacon, which is configured to be used by the receiver to verify that the receiver is capable of receiving with the correct data and power level. In this way, the PSD and MSD no longer need to be in continuous communication mode. The PSD can be set up as a beacon, such that any MSD that comes within a defined range (e.g., within a defined proximity to the PSD, etc.) can be triggered to stop operating while maintaining a Performance Level d (PL-d) or other suitable functional safety level.

Figure 1:
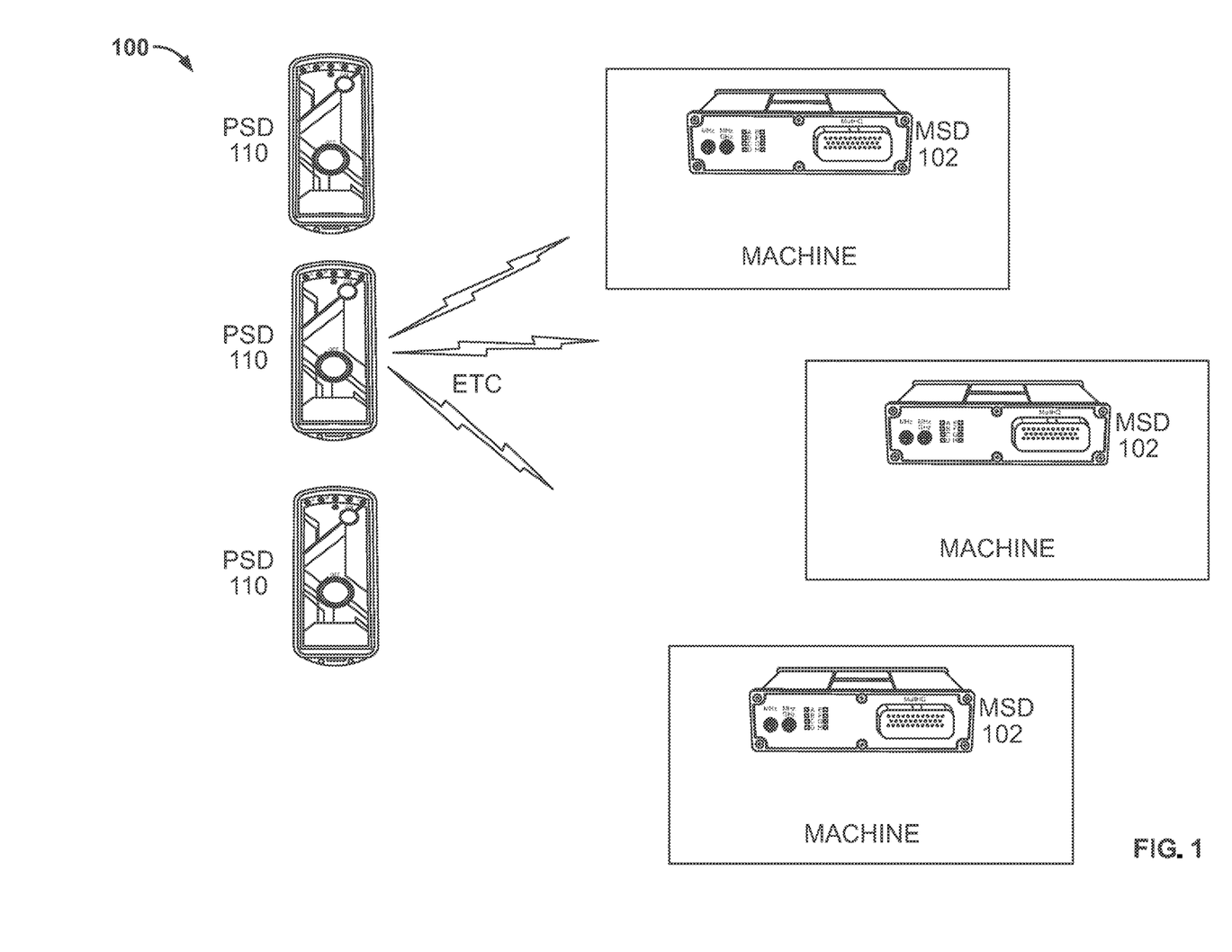
FIG. 1 illustrates a wireless Proximity Stop system configured with radio frequency (RF) diagnostic coverage according to exemplary embodiments of the present disclosure.

To protect against a beacon (PSD) unexpectedly ceasing to transmit, exemplary embodiments of the wireless Proximity Stop systems are configured such that the release of the MSDs is only possible if the MSDs have received a positive release command from each of the PSDs that have been detected With reference now to the figures, FIG. 1 illustrates an exemplary embodiment of a wireless Proximity Stop system 100 configured with radio frequency (RF) diagnostic coverage as disclosed herein. The system 100 includes three machine safety devices (MSDs) 102 mounted on three machines and three personal safety devices (PSDs) 110. But the system 100 may be configured differently, e.g., with more or less than three MSDs 102 and/or with more or less than three PSDs 110, etc.

Figure 3:
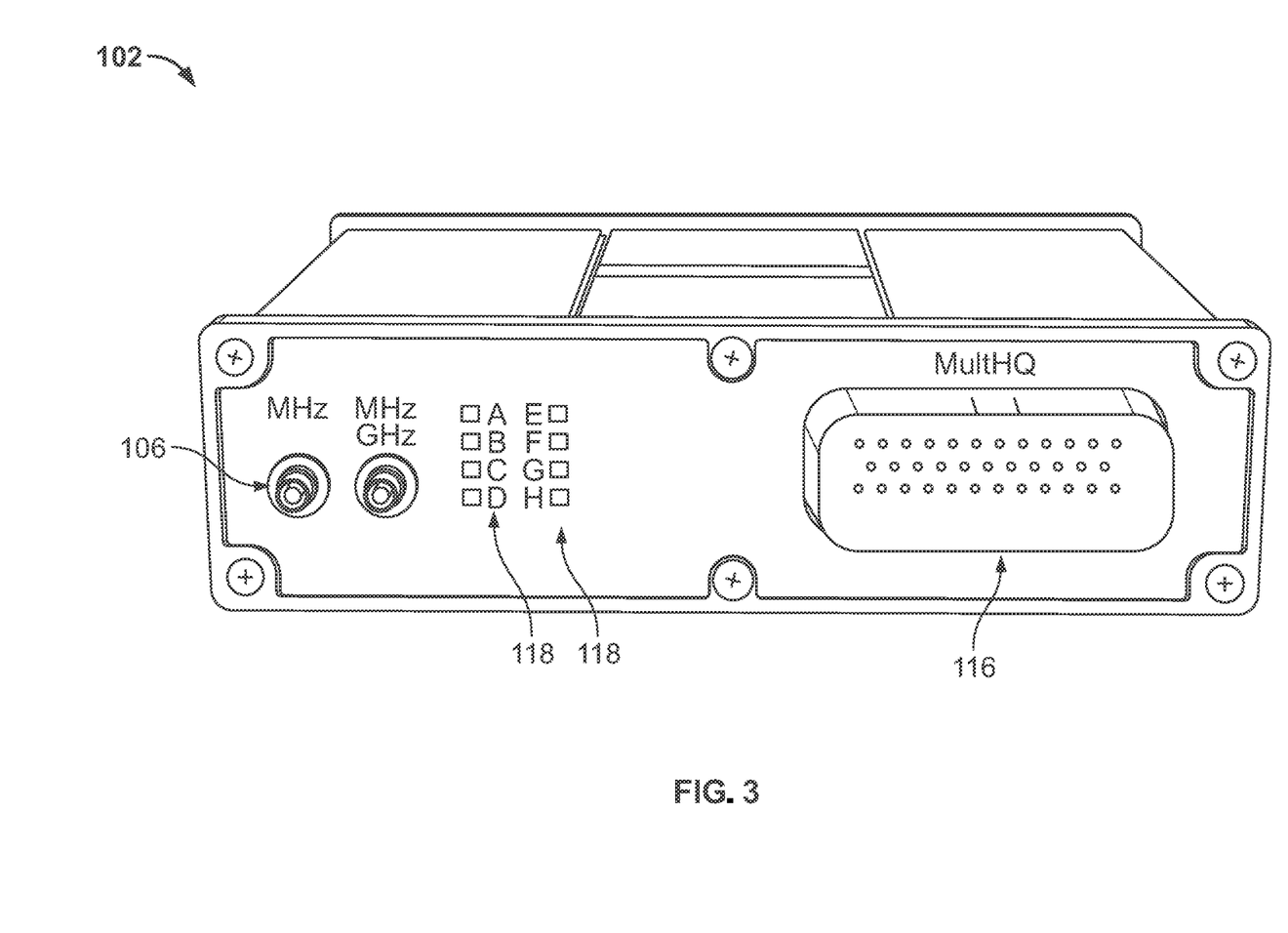
FIG. 3 is a front view of a machine safety device (MSD) of the wireless Proximity Stop system illustrated in FIG. 1.

Each MSD 102 is configured to be coupled with or integrated to (e.g., wired to, etc.) a machine stop circuit for stopping operation of a machine, when the machine stop circuit is activated. Each MSD 102 includes a wireless communication interface 106 as shown in FIG. 3. For example, the wireless communication interface 106 of the MSD 102 will include any suitable antenna configured for wireless communication (e.g., radio frequency (RF) wireless communication, etc.).

Each PSD 110 includes a wireless communication interface for wireless communication with the MSD 102 (e.g., via the wireless communication interface 106 of the MSD 102, etc.). Each PSD 110 is configured to be operable with or include a method of turning the beacon on and a secure method of turning the beacon off and positively releasing the MSDs 102.

As noted above, the wireless Proximity Stop system 100 is configured with radio frequency (RF) diagnostic coverage. More specifically, the PSDs 110 and MSDs 102 are configured to integrate diagnostic coverage into their radio frequency (RF) systems. In such exemplary embodiments, each PSD 110 includes a transmitter and separate receiver, both in a Category 3 architecture, which verifies the transmitter is transmitting with the correct data and power level. Each MSD 102 includes a receiver and a separate transmitter or local transmitting beacon, which is configured to be used by the receiver to verify that the receiver is capable of receiving with the correct data and power level. In this way, the PSD 110 and MSD 102 no longer need to be in continuous communication mode. The PSD 110 can be set up as a beacon, such that any MSD 102 that comes within range (e.g., within a defined proximity to the PSD 110, etc.) can be caused to stop operating while maintaining a Performance Level d (PL-d) or other suitable functional safety level.

Figure 2:
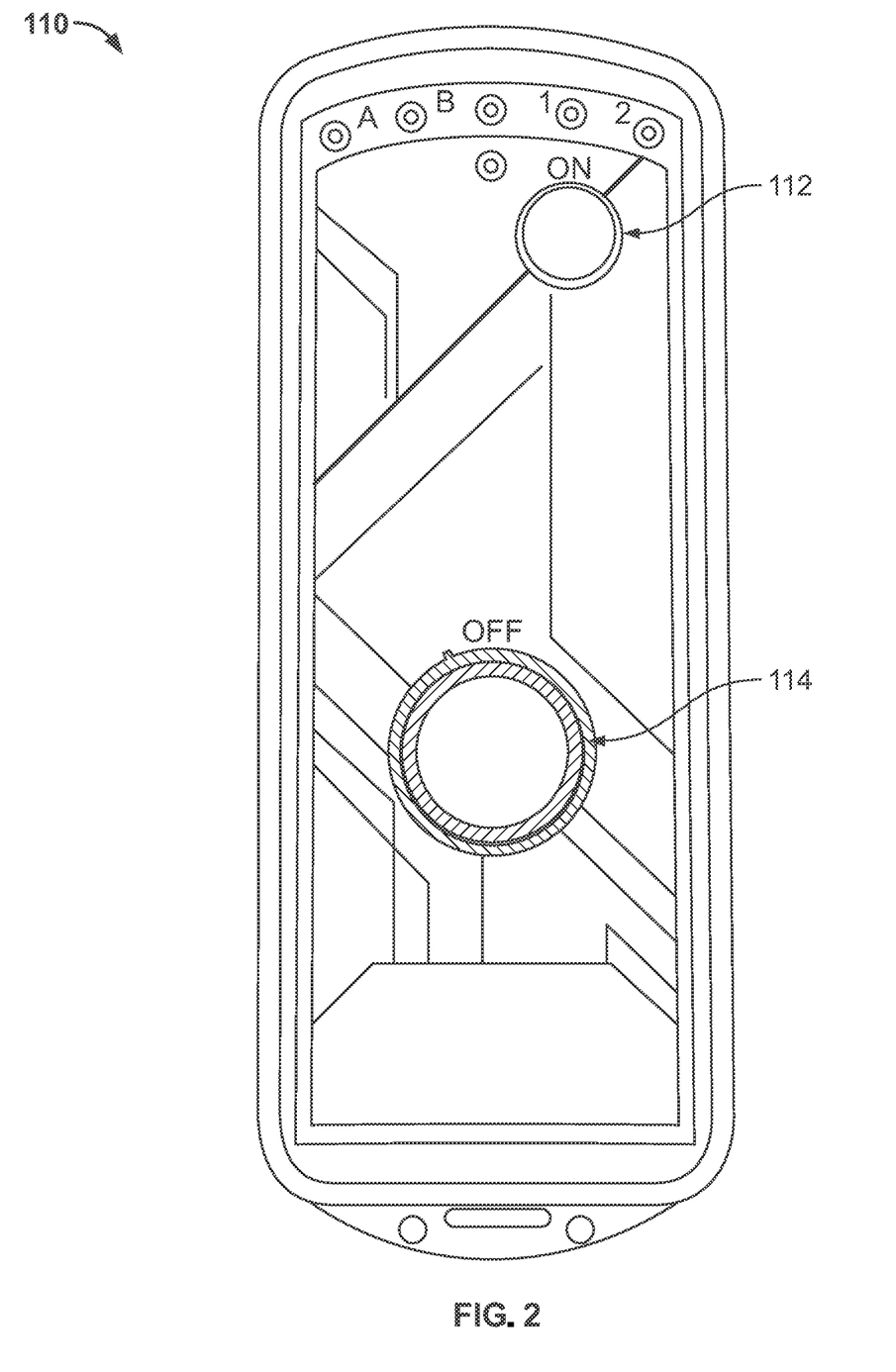
FIG. 2 is a front view of an operator control unit (OCU) or personal safety device (PSD) of the wireless Proximity Stop system illustrated in FIG. 1.

FIG. 2 shows an operator control unit (OCU) 110 usable as a PSD in a wireless Proximity Stop system (e.g., system 100 in FIG. 1, etc.) configured with RF diagnostic coverage according to exemplary embodiments of the present disclosure. The wireless Proximity Stop system is preferably configured to provide a wireless Proximity Stop solution with a PL-d Safety Level, which will be used, for example, with automated vehicles, robotics, mining machinery, stacker cranes, forklift trucks, on and off highway mobile equipment, in mining, manufacturing, transportation, warehousing, etc. The PSD 110 is preferably configured for PL-d safety level machine safety applications. The PSD 110 is preferably configured with methods to turn on and delink the PSD 110 as well as visual and haptic operator feedback.

FIG. 3 shows a machine safety device (MSD) 102 usable in a wireless Proximity Stop system (e.g., system 100 in FIG. 1, etc.) configured with RF diagnostic coverage according to exemplary embodiments of the present disclosure. The MCU 102 may be configured with features such as: Bluetooth® technology for closed box programming, configuration/diagnostics and data log download, safety relays, a digital bus, secure digital (SD) memory card for data logging, RF communication, wide range power supply EN/ISO 13849 Performance Level d (PL-d), and UL/ISO 61010 Electrical Safety.

Figure 4:
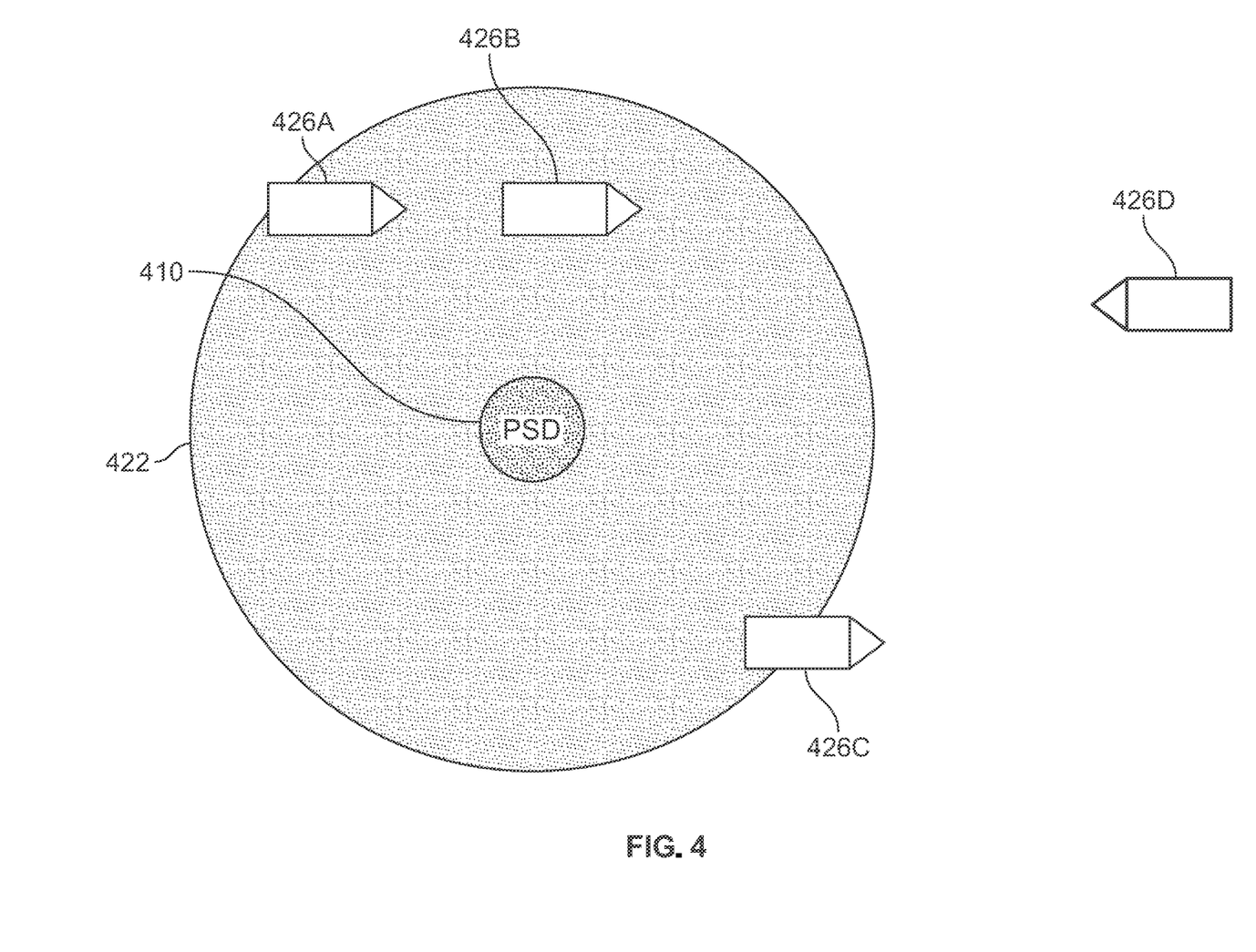
FIG. 4 shows a PSD, a proximity detection zone around the PSD, and four vehicles or machines including MSDs. As shown in this Proximity Stop mode example, the operation of the three vehicles or machines within the proximity detection zone have been stopped, which is indicated by the red outline around these three vehicles or machines. The operation of the fourth vehicle or machine that is outside the proximity detection zone has not been stopped, which is indicated by the green outline around the fourth vehicle or machine.

FIG. 4 shows a PSD or operator control unit 410 (e.g., PSD 110 in FIGS. 1 and 2, etc.), a proximity detection zone 422 around the PSD 410, and four vehicles or machines 426A, 426B, 426C, and 426D including MCUs (e.g., MSD 102 in FIGS. 1 and 3, etc.). The proximity detection zone 422 is indicated by the circle around the PSD 410. If a vehicle or machine 426 is within the proximity detection zone 422, the PSD 410 will be in close enough proximity to the MCU to automatically trigger one or more safety relays of the MCU to open and thereby stop operation of the vehicle or machine 426 within the proximity detection zone 422. In this Proximity Stop mode example shown in FIG. 4, the operation of the three vehicles or machines 426A, 426B, and 426C within the proximity detection zone 422 have been stopped, which is indicated by the red outline around these three vehicles or machines 426A, 426B, and 426C. The operation of the fourth vehicle or machine 426D that is outside the proximity detection zone has not been stopped, which is indicated by the green outline around the fourth vehicle or machine 426D.

In exemplary embodiments, a wireless Proximity Stop system is configured or provided with diagnostic coverage to the RF transmission and reception to verify that RF communications are possible in a non-maintained link. In some exemplary embodiments, the wireless Proximity Stop system includes multiple PSDs operating with a single machine safety device. In these exemplary embodiments, the PSDs are configured or required to follow a delinking protocol with the machine safety device (e.g., when protection is no longer required) to enable the machine to restart operation.

The machine safety device may be hardwired into a machine stop circuit and/or into a digital bus (e.g., a safety circuit capable of shutting down operation of the machine, etc.). The machine stop circuit includes a radio interface capable of wireless communication with one or more PSDs.

The machine safety device is configured to implement a high level of safety by maintaining its safety relay(s) closed or bus status safe (e.g., so that a connected machine is allowed to operate normally, etc.) when no PSDs have been detected and no internal faults of the machine safety device are detected. If one or more PSDs are detected by the machine safety device, the machine safety device will open its safety relays or change its bus status to stop and maintain that state until all previously detected PSDs have issued a release command.

Each PSD is configured to follow a protocol for initiating Proximity Stop mode and another for positively de-linking from the machine safety device to enable the machine to restart. This protocol preferably includes one or more direct actions from the operator to initiate or de-link the PSD. The delinking process also protects against a loss of wireless communication from the PSD.

With continued reference to FIG. 1, each machine safety device 102 can be configured for wireless connection with one or more than one PSD 110 at the same time. This provides multiple operators with the ability to trigger a Proximity Stop of a machine via their corresponding PSDs 110. In exemplary embodiments, each machine safety device 102 is configured to be in wireless communication with more than one PSDs 110 simultaneously.

In some embodiments, the machine safety device 102 includes one or more safety relays. In such exemplary embodiments, the machine safety device 102 includes one or more safety relays for state change in response to a Proximity Stop activation, and one or more safety relays for state change in response to a loss of RF diagnostic coverage. Each of the one or more safety relays is connected to the machine stop circuit. The relays may include multiple switches (e.g., single contact switches, two-level enable switches, etc.). The relays are redundant. For example, two safety relays may be wired in series with an external hard-wired E-stop circuit that allows a machine to run.

The machine safety device 102 is configured to open the relay(s) or change its bus status to stop to thereby stop operation of the machine when a Proximity Stop is triggered by one or more of the multiple PSDs 110. The machine safety device 102 will otherwise maintain the relay(s) in a closed state or maintain the bus in a safe state to allow operation of the machine while the Proximity Stop is not triggered.

In exemplary embodiments, the machine safety device 102 will be configured to use any suitable protocol(s) for determining when to allow normal operation of the machine (e.g., by leaving relay(s) of the machine safety device 102 in a closed state, etc.). For example, when no PSDs 110 have been detected (e.g., linked with, etc.) the machine safety device 102, the machine safety device 102 will maintain normal operation when no internal fault of the machine safety device 102 is detected.

PSDs 110 may be detectable by the machine safety device(s) 102, as within proximity by a signal quality threshold (e.g., a threshold indicative of sufficient RF signal strength, such as an RSSI threshold value, etc.), or by a range detection method such as Time of Flight, Angle of Arrival, etc.

The machine safety device 102 is configured to stop operation of the machine (e.g., by opening its safety relay(s) or setting its bus status to stop, etc.) when any one of multiple events occurs, such as an internal fault of the machine safety device 102 is detected, a failure of the RF diagnostics channel, inability to verify, via the MSD transmitter or local transmitting beacon, that the receiver is capable of receiving the correct data from a PSD, etc.

The PSD 110 is preferably configured to clearly show the operator that it is operating safely, such as by visual and haptic feedback, etc. Additionally, a local safety fence gate interlock may be provided that will only enable a safety gate to be opened if the beacon transmission is detected. After the beacon is activated, any MSD that comes within range (e.g., within a defined proximity to the PSD 410 as shown in FIG. 4, etc.) can be caused to stop operating and in addition to stopping operation of the machine when a Proximity Stop is detected, prevents initiation of the machine if a PSD 110 is unable to properly transmit a de-link command to the machine safety device 102. This prevents situations that would arise in using a wireless Proximity Stop system 100 where PSDs 110 rely on wireless communication to maintain Proximity Stop events.

A user will be able to unlink the PSD 110 from the machine safety device 102 by using the unlinking protocol. For example, a user may be required to press a sequence of buttons that cannot be accidentally initiated to unlink the PSD 110. Visual and haptic feedback may be integrated to the PSD 110 to indicate when the unlinking process is complete.

Each PSD 110 may be configured to include a secure method for identifying the identity of a user, such as a radio frequency identification (RFID) card, a biometric identifier, etc. The user will have pre-defined authorization right(s), which can be stored locally and/or remotely. If the user has appropriate authorization right(s), the PSD 110 will be allowed to commence operation.

Additional safety may be provided to a Safety Cell by connecting an MSD 102 to the door interlock system such that the door can only be opened if the PSD 110 has been turned on prior to entry.

The MSDs 102 and the PSDs 110 may comprise any suitable devices (e.g., computing devices, etc.) configurable to perform operations described herein using any suitable combination of software and/or hardware. For example, the MSDs 102 and the PSDs 110 may include any suitable circuitry, logic gates, microprocessor(s), computer-executable instructions stored in memory, etc., operable to cause the MSDs 102 and the PSDs 110 to perform the actions described herein (e.g., triggering a Proximity Stop, etc.).

As illustrated in FIG. 2, the PSD 110 includes operation inputs 112 and 114. For example, the operation inputs of the PSD 110 can include one or more buttons allowing an operator to link and de-link the PSD 110 to/from a machine safety device 102.

In some embodiments, the PSDs 110 will include visual and haptic (e.g., vibration) warning systems for conditions such as low battery, low RF signal, etc. Further, as a connected PSD 110 moves towards the edge of its operating range (e.g., about 100 meters from the machine safety device 102, etc.), the PSD 110 may alert the user to return to a location with a stronger signal.

FIG. 3 illustrates the machine safety device 102 of the Proximity Stop system 100 shown in FIG. 1. As described above, the machine safety device 102 includes a wireless communication interface 106 for wireless communication with the PSDs 110. The wireless communication interface 106 illustrated in FIG. 3 is a connector for a wireless antenna, etc.

The machine safety device 102 also includes a machine stop circuit connection 116 for connection to a machine stop circuit (e.g., a hard wired E-Stop output, a safety bus connection, etc.). The machine stop circuit connection 116 may be connected to a main power circuit of the machine, a main power reset of the machine, a hard wired Emergency stop switch of the machine, a safety programmable logic controller (PLC), etc. For example, the machine safety device 102 may be configured to be operable for changing a status of a safety bus to stop operation of the machine, etc.

As shown in FIG. 3, the machine safety device 102 includes indicators 118. The indicators 118 provide status information about the machine safety device 102, PSDs 110 in wireless communication with the machine safety device 102, etc. The indicators 118 may include one or more light emitting diodes (LEDs), a display (e.g., a liquid crystal display, etc.), etc. For example, the indicators 118 are usable for indicating operational states, errors, under-voltage conditions, relay statuses, Ethernet statuses, received signal strength indicator (RSSI) corresponding to wireless communication with the PSDs 110, etc.

The machine safety device 102 may comprise a programmable logic controller (PLC) device, and may be housed within an enclosure. The machine safety device 102 may be mountable to a DIN rail, may include an Ethernet IP connector, a power supply connector, multiple safety relays (e.g., at least four safety relays), etc.

In some embodiments, the PSDs 110 may function primarily as a wireless Proximity Stop device, such that the PSDs 110 do not include control functions for the machine. In this case, the PSDs 110 include operation inputs for enabling and disabling the PSD 110s, turning on and turning off the PSDs 110, linking and de-linking the PSD 110s with the machine safety device 102, etc.

In some embodiments, the PSDs 110 may include a force sensor and/or a tilt sensor. The force sensor and/or tilt sensor may detect a fall event, etc. of an operator, and transmit the fall event to machine safety device 102. In this case, the machine safety device 102 may trigger an emergency stop of the machine (e.g., because a fallen operator may not be able to correctly supervise the machine, may have been injured by the machine, etc.).

Accordingly, exemplary embodiments are disclosed of wireless Proximity Stop systems configured or provided with diagnostic coverage to radio frequency (RF) transmission and reception to verify that RF communications are at all times possible between each PSD and each MSD in a non-maintained RF link. In exemplary embodiments, a wireless Proximity Stop system includes one or more MSDs and one or more PSDs. Each MSD is configured to be coupled with or integrated to (e.g., wired, etc.) to a machine stop circuit for stopping operation of a connected machine when a Proximity Stop function is triggered. Each MSD includes a wireless communication interface with Diagnostic Coverage (DC). Each PSD includes a wireless communication interface with Diagnostic Coverage (DC) for wireless communication with the one or more MSDs. Each PSD is configured to be operable for initiating and safely terminating a Proximity Stop signal to the one or more MSDs to trigger a Proximity Stop function of the one or more MSDs for stopping operation of the connected machine(s). Each PSD includes a transmitter and separate receiver operable for verifying that the transmitter is transmitting with the correct data and power level. Each MSD includes a receiver and a separate transmitter or local transmitting beacon usable by the receiver for verifying that the receiver is capable of receiving with the correct data and power level.

In exemplary embodiments, the wireless Proximity Stop system is configured such that each PSD and each MSD are not required to be in continuous communication mode to continue safe operation of the connected machine(s).

In exemplary embodiments, each PSD is configured to be operable as a beacon such that the Proximity Stop function is triggered for any MSD that comes within a defined proximity to said PSD for stopping operation of the connected machine(s) within the defined proximity while maintaining a suitable functional safety level.

In exemplary embodiments, the transmitter and the separate receiver of each PSD are configured to have a Category 3 architecture.

In exemplary embodiments, the wireless Proximity Stop system is configured to be operable for verifying radio frequency (RF) transmission and reception to verify that RF communications are possible between each PSD and each MSD in a non-maintained link.

In exemplary embodiments, each MSD is wired to a corresponding machine stop circuit for stopping operation of the connected machine when the machine stop circuit is activated.

In exemplary embodiments, the wireless Proximity Stop system is configured such that each PSD and each MSD incorporates a safe wireless communication interface to implement a Proximity Stop mode that when activated allows the MSD to receive the transmitted Proximity Stop signal of one or more PSDs and trigger the Proximity Stop function for stopping operation of the connected machine(s).

In exemplary embodiments, the wireless Proximity Stop system is configured to define a Proximity Stop trigger(s) by one or more of a signal level, time of flight, angle of departure, and/or angle of arrival.

In exemplary embodiments, the wireless Proximity Stop system is configured to be operable for safely re-enabling any MSDs that have been placed in a stop state by detection of Proximity Stop criteria, e.g., thereby avoiding or eliminating the risk of MSD restart associated with PSD failure in operation.

In exemplary embodiments, each MSD is configured to be operable to open its safety relay(s) or change its bus status to stop to thereby stop operation of the connected machine when the Proximity Stop function is triggered by one or more of the one or more PSDs. And each MSD is configured to be operable to maintain its safety relay(s) closed or maintain its bus in a safe state to thereby allow continued operation of the connected machine while the Proximity Stop function is not triggered.

In exemplary embodiments, each MSD is configured to be operable to maintain its safety relay(s) closed or maintain its bus status safe so that the connected machine is allowed to operate normally when no PSDs have been detected and no internal faults of the MSD are detected. And each MSD is configured to be operable to open its safety relay(s) or change its bus status to stop to thereby stop operation of the connected machine when one or more PSDs are detected by the MSD and to maintain that state until all previously detected PSDs have issued a release command.

In exemplary embodiments, each MSD includes one or more safety relays for state change in response to the Proximity Stop function being triggered. Each MSD also includes one or more safety relays for state change in response to a loss of RF diagnostic coverage. Each of the one or more safety relays are connected to a machine stop circuit.

In exemplary embodiments, the wireless Proximity Stop system is configured such that the one or more PSDs are detectable by the one or more MSDs as being within proximity of the one or more MSDs by a signal quality threshold and/or by a range detection method. In such exemplary embodiments, the wireless Proximity Stop system may be further configured such that the Proximity Stop function is triggered for the one more MSDs after detecting the one or more PSDs as being within proximity by the signal quality threshold and/or by the range detection method.

In exemplary embodiments, the wireless Proximity Stop system is configured such that the one or more PSDs are detectable by the one or more MSDs as being within proximity by a threshold indicative of sufficient RF signal strength including an RSSI threshold value, other signal level, a time of flight, an angle of departure, and/or an angle of arrival. In such exemplary embodiments, the wireless Proximity Stop system may be further such that the Proximity Stop function is triggered for the one more MSDs after detecting the one or more PSDs as being within proximity by the threshold indicative of sufficient RF signal strength including the RSSI threshold value, other signal level, the time of flight, the angle of departure, and/or the angle of arrival.

In exemplary embodiments, the wireless Proximity Stop system is configured or provided with diagnostic coverage to radio frequency (RF) transmission and reception to verify that RF communications are possible between each PSD and each MSD in a non-maintained link.

In exemplary embodiments, the wireless Proximity Stop system is configured to be operable for ensuring the one or more MSDs remain in a safe state should the one or more PSDs unexpectedly stop transmissions.

In exemplary embodiments, the wireless Proximity Stop system is configured to be operable for using a beacon(s) of the one or more PSDs as part of a safety barriers door interlock system to eliminate manual error by ensuring that each PSD is correctly activated prior to entry.

Also disclosed exemplary methods of operating wireless proximity stop systems. In exemplary embodiments, a method is defined to safely re-enable any MSDs of a wireless Proximity Stop system that have been placed in a stop state (e.g., by detection of the Proximity Stop criteria), e.g., to thereby eliminate the risk of MSD restart associated with PSD failure in operation. In exemplary embodiments, a method is defined to ensure MSDs of a wireless Proximity Stop system remain in a safe state in the event one or more PSDs of the wireless Proximity Stop system unexpectedly stop transmissions. In exemplary embodiments, a method includes using a beacon(s) of one or more PSDs as part of a safety barriers door interlock system to eliminate manual error by ensuring that each PSD is correctly activated prior to entry. Additional safety related enhancements and interlocks are also disclosed herein that further ensure operator safety.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments will be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" will be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps will be employed.

When an element or layer is referred to as being "on", "engaged to", "connected to" or "coupled to" another element or layer, it will be directly on, engaged, connected or coupled to the other element or layer, or intervening elements or layers will be present. In contrast, when an element is referred to as being "directly on," "directly engaged to", "directly connected to" or "directly coupled to" another element or layer, there will be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that will arise from ordinary methods of measuring or using such parameters. For example, the terms "generally", "about", and "substantially" will be used herein to mean within manufacturing tolerances.

Although the terms first, second, third, etc. will be used herein to describe various elements, components, regions, layers and/or sections, these elements, components, regions, layers and/or sections should not be limited by these terms. These terms will be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, will be used herein for ease of description to describe one element or feature's relationship to another element(s) or feature(s) as illustrated in the figures. Spatially relative terms will be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device will be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same will also be varied in many ways. Such variations are not to be regarded as a departure from the disclosure, and all such modifications are intended to be included within the scope of the disclosure.

The invention claimed is:

1. A wireless Proximity Stop system comprising:
one or more Machine Safety Devices (MSDs) each configured to be coupled with or integrated to a machine stop circuit for stopping operation of a connected machine when a Proximity Stop function is triggered, each MSD including a wireless communication interface with Diagnostic Coverage (DC); and
one or more Personal Safety Devices (PSDs) each including a wireless communication interface with Diagnostic Coverage (DC) for wireless communication with the one or more MSDs, each PSD configured to be operable for initiating and safely terminating a Proximity Stop signal to the one or more MSDs to trigger the Proximity Stop function for stopping operation of the connected machine(s);
wherein:
each PSD includes a transmitter and separate receiver operable for verifying that the transmitter is transmitting with the correct data and power level; and
each MSD includes a receiver and a separate transmitter or local transmitting beacon usable by the receiver for verifying that the receiver is capable of receiving with the correct data and power level;
wherein the system is configured such that each PSD and each MSD are not required to be in continuous communication mode to continue safe operation of the connected machine(s).

2. The wireless Proximity Stop system of claim 1, wherein each PSD is configured to be operable as a beacon such that the Proximity Stop function is triggered for any MSD that comes within a defined proximity to said PSD for stopping operation of the connected machine(s) within the defined proximity.

3. The wireless Proximity Stop system of claim 1, wherein the transmitter and the separate receiver of each PSD are configured to have a Category 3 architecture.

4. The wireless Proximity Stop system of claim 1, wherein the system is configured to be operable for verifying radio frequency (RF) transmission and reception to verify that RF communications are possible between each PSD and each MSD in a non-maintained link.

5. The wireless Proximity Stop system of claim 1, wherein each MSD is wired to a corresponding machine stop circuit for stopping operation of the connected machine when the machine stop circuit is activated.

6. The wireless Proximity Stop system of claim 1, wherein the system is configured such that each PSD and each MSD incorporates a safe wireless communication interface to implement a Proximity Stop mode that when activated allows the MSD to receive the transmitted Proximity Stop signal of one or more PSDs and trigger the Proximity Stop function for stopping operation of the connected machine(s).

7. The wireless Proximity Stop system of claim 1, wherein the system is configured to define a Proximity Stop trigger(s) by one or more of a signal level, time of flight, angle of departure, and/or angle of arrival.

8. The wireless Proximity Stop system of claim 1, wherein the system is configured to be operable for safely re-enabling any MSDs that have been placed in a stop state by detection of Proximity Stop criteria.

9. The wireless Proximity Stop system of claim 1, wherein each MSD is configured to be operable to:
open its safety relay(s) or change its bus status to stop to thereby stop operation of the connected machine when the Proximity Stop function is triggered by one or more of the one or more PSDs; and
maintain its safety relay(s) closed or maintain its bus in a safe state to thereby allow continued operation of the connected machine while the Proximity Stop function is not triggered.

10. The wireless Proximity Stop system of claim 1, wherein each MSD is configured to be operable to:
maintain its safety relay(s) closed or maintain its bus status safe so that the connected machine is allowed to operate normally when no PSDs have been detected and no internal faults of the MSD are detected; and
open its safety relay(s) or change its bus status to stop to thereby stop operation of the connected machine when one or more PSDs are detected by the MSD and to maintain that state until all previously detected PSDs have issued a release command.

11. The wireless Proximity Stop system of claim 1, wherein each MSD includes:
one or more safety relays for state change in response to the Proximity Stop function being triggered; and
one or more safety relays for state change in response to a loss of RF diagnostic coverage;
wherein each of the one or more safety relays are connected to a machine stop circuit.

12. The wireless Proximity Stop system of claim 1, wherein the system is configured such that the one or more PSDs are detectable by the one or more MSDs as being within proximity of the one or more MSDs by a signal quality threshold and/or by a range detection method.

13. The wireless Proximity Stop system of claim 12, wherein the system is configured such that the Proximity Stop function is triggered for the one or more MSDs after detecting the one or more PSDs as being within proximity by the signal quality threshold and/or by the range detection method.

14. The wireless Proximity Stop system of claim 1, wherein the system is configured such that the one or more PSDs are detectable by the one or more MSDs as being within proximity by a threshold indicative of sufficient RF signal strength including an RSSI threshold value, other signal level, a time of flight, an angle of departure, and/or an angle of arrival.

15. The wireless Proximity Stop system of claim 14, wherein the system is configured such that the Proximity Stop function is triggered for the one or more MSDs after detecting the one or more PSDs as being within proximity by the threshold indicative of sufficient RF signal strength including the RSSI threshold value, other signal level, the time of flight, the angle of departure, and/or the angle of arrival.

16. The wireless Proximity Stop system of claim 1, wherein the system is configured or provided with diagnostic coverage to radio frequency (RF) transmission and reception to verify that RF communications are possible between each PSD and each MSD in a non-maintained link.

17. The wireless Proximity Stop system of claim 1, wherein the system is configured to be operable for ensuring the one or more MSDs remain in a safe state should the one or more PSDs unexpectedly stop transmissions.

18. The wireless Proximity Stop system of claim 1, wherein the system is configured to be operable for using a beacon(s) of the one or more PSDs as part of a safety barriers door interlock system in which each PSD must be correctly activated prior to entry.

19. The wireless Proximity Stop system of claim 1, wherein:
each PSD is configured to be operable as a beacon such that the Proximity Stop function is triggered for any MSD that comes within a defined proximity to said PSD for stopping operation of the connected machine(s) within the defined proximity;

the system is configured to be operable for verifying radio frequency (RF) transmission and reception to verify that RF communications are possible between each PSD and each MSD in a non-maintained link;

each MSD is wired to a corresponding machine stop circuit for stopping operation of the connected machine when the machine stop circuit is activated;

the system is configured such that the one or more PSDs are detectable by the one or more MSDs as being within proximity by a threshold indicative of sufficient RF signal strength including an RSSI threshold value, other signal level, a time of flight, an angle of departure, and/or an angle of arrival; and the system is configured such that the Proximity Stop function is triggered for the one or more MSDs after detecting the one or more PSDs as being within proximity by the threshold indicative of sufficient RF signal strength including the RSSI threshold value, other signal level, the time of flight, the angle of departure, and/or the angle of arrival.

20. The wireless Proximity Stop system of claim 1, wherein:

each PSD is configured to be operable as a beacon such that the Proximity Stop function is triggered for any MSD that comes within a defined proximity to said PSD for stopping operation of the connected machine (s) within the defined proximity;

the system is configured to be operable for verifying radio frequency (RF) transmission and reception to verify that RF communications are possible between each PSD and each MSD in a non-maintained link;

each MSD is wired to a corresponding machine stop circuit for stopping operation of the connected machine when the machine stop circuit is activated;

the system is configured such that the one or more PSDs are detectable by the one or more MSDs as being within proximity of the one or more MSDs by a signal quality threshold and/or by a range detection method; and the system is configured such that the Proximity Stop function is triggered for the one or more MSDs after detecting the one or more PSDs as being within proximity by the signal quality threshold and/or by the range detection method.

* * * * *